United States Patent
Heap

(10) Patent No.: US 8,432,895 B2
(45) Date of Patent: Apr. 30, 2013

(54) INTELLIGENT ROUTING OF VOIP TRAFFIC

(75) Inventor: Steven Heap, Haymarket, VA (US)

(73) Assignee: AIP Acquisition LLC, Fort Lee, NJ (US)

(*) Notice: Subject to any disclaimer, the term of this patent is extended or adjusted under 35 U.S.C. 154(b) by 1312 days.

(21) Appl. No.: 12/072,163

(22) Filed: Feb. 25, 2008

(65) Prior Publication Data
US 2008/0205382 A1    Aug. 28, 2008

Related U.S. Application Data

(60) Provisional application No. 60/903,085, filed on Feb. 23, 2007.

(51) Int. Cl.
H04L 12/28 (2006.01)
(52) U.S. Cl.
USPC .......................................................... 370/351
(58) Field of Classification Search .................. None
See application file for complete search history.

(56) References Cited

U.S. PATENT DOCUMENTS

| 6,731,729 | B2 | 5/2004 | Eng et al. |
| 2001/0014149 | A1* | 8/2001 | Ooi et al. ................. 379/114.02 |
| 2002/0112073 | A1* | 8/2002 | MeLampy et al. ............ 709/240 |
| 2006/0083222 | A1* | 4/2006 | Miyajima et al. ............. 370/352 |
| 2008/0019267 | A1* | 1/2008 | Ku et al. ....................... 370/229 |

* cited by examiner

Primary Examiner — Otis L Thompson, Jr.
(74) Attorney, Agent, or Firm — Lucas & Mercanti, LLP

(57) ABSTRACT

A method of routing communications traffic includes receiving, at a switch or server of an originating service provider, incoming communications traffic including a terminating number or address. The switch or server is programmed to send a query to a transaction server for a carrier routing. The transaction server determines whether the terminating number or address matches a number in an ENUM database in communication with the transaction server. If a match is found, the carrier associated with the matched number is added to a routing matrix generated by an offline routing matrix generation process to form a supplemental routing matrix. The transaction server then generates using the supplemental routing matrix a list of available route options for delivering the communications traffic to the terminating number or address.

20 Claims, 3 Drawing Sheets

US 8,432,895 B2

INTELLIGENT ROUTING OF VOIP TRAFFIC

RELATED APPLICATIONS

This application claims priority from U.S. Provisional Patent Application Ser. No. 60/903,085 which was filed on Feb. 23, 2007.

BACKGROUND OF THE INVENTION

1. Field of the Invention

The present invention relates to a system and method for routing communications traffic.

2. Description of the Related Art

The advent of the Internet has provided an impetus to integrate telecommunications services and Internet services. Voice over Internet Protocol (VoIP) service is a well-known outgrowth of such development. However, VoIP technology in its present form provides only a partial solution, as it cannot directly route telephone calls from one traditional telephone to another. One important difference between traditional telephony and Internet-based services is that traditional telephone networks terminate phone calls using telephone numbers defined by the universally adopted E.164 numbering system, while the Internet identifies its various nodes and resources using domain names and IP addresses.

The Internet Engineering Task Force (IETF) has responded by developing the ENUM protocol, which translates telephone numbers into unique Internet domain names. Theoretically, if universally adopted by telecommunications service providers, a telecommunication device (e.g., a telephone or a facsimile machine) with a properly assigned ENUM can be reached directly through the Internet.

The development of such an ENUM system presupposes that a service provider would accept incoming calls to their customers at no cost to the sending carrier. So if the originating carrier undertook an ENUM query against a called number and discovered the identity and IP routing information for the terminating carrier, then the call could be routed directly to that carrier without further analysis.

VoIP peering relates to a relationship between carriers in which they agree to exchange VoIP traffic to keep the VoIP traffic as IP packets instead of using the Public Switched Telephone Network (PSTN). VoIP peering uses the ENUM protocol to discover the identity of the carrier providing service to the called customer. In general, keeping the VoIP traffic on the IP networks lowers costs, improves quality, and allows implementation of IP-enabled services.

In contrast to the above-described VoIP peering and ENUM plans, telephone calls are typically routed by Time Division Multiplexer (TDM) and VoIP service providers using Least Cost Routing (LCR) plans. The LCR plans are entered into a TDM or VoIP switch and the switch routes incoming calls to the appropriate carrier partner based on the LCR plans, overflowing from the least expensive to the most expensive carrier if no capacity is available in the early route choices.

Most large service providers currently receiving termination payments for calls incoming to their customers will not likely give up this revenue stream. Thus, an ENUM or VoIP peering generated routing choice is not necessarily the most optimal as it cannot be assumed to be the lowest cost.

Furthermore, a switch of a service provider which receives a request for route does not query both LCR plans and VoIP peering routing choices for the same call. Rather, the switch chooses from either an LCR plan or a VoIP peering plan.

SUMMARY OF THE INVENTION

An object of the present invention is to provide a system and method to facilitate adoption of ENUM-based telephony by traditional, commercial telephone carriers.

Another object of the present invention is to integrate VoIP peering and Least Cost Routing plans.

Another object of the present invention is to provide additional functionalities to the ENUM-based technology to permit telephone calls to be more efficiently routed by traditional carriers and/or Internet service providers.

Still another object of the invention is to provide intelligent routing of communications traffic via the internet protocol based on price and quality characteristics of networks of terminating service providers.

The present invention provides advantageous functionalities of an ENUM or similar SIP Redirect Server process to the traditional Least Cost Routing (LCR) process.

An off-line routing matrix generation process creates a matrix of routing choices for each destination or market (e.g., a region of a country or a set of specific dialing codes) together with the price and other parameters particular to each available carrier offering to terminate communications traffic (e.g., phone calls) to that destination or market. The generation of the matrix is performed either manually using spreadsheets or tables, or using a dedicated application. In addition to this normal operational function, the routing matrix generation process will also include on-net service providers which have their own end-customers directly accessible via a full number query using the ENUM or SIP Redirect protocols together with their associated selection criteria such as, for example, a specific price and related quality criteria For example Carrier A could offer a price of $0.02 per minute to terminate calls to the UK, and the same Carrier could offer a price of $0.01 per minute to terminate calls to its own on-net customers in the UK (as an on-net carrier). Both routing choices with the different prices would be entered into the routing matrix as alternatives. Preferably, the routing matrix contains dialing codes with the carrier price together with a special identifying flag identifying the on-net carrier price for that set of dialing codes.

The routing matrix will be imported into an ENUM or SIP Redirect transaction server.

The transaction server may also hold a table of all telephone numbers that are directly routable via peering arrangements together with the identity of the serving or terminating carrier and the routing information associated with such carrier. This information may have been directly inserted in the transaction server or may have been downloaded from a central depository of ENUM-based telephone numbers, e.g., a Registry such as SPIDER. This table is defined herein as the ENUM table.

An application is written for the ENUM or SIP Redirect transaction server to effect the method according to the present invention. An incoming call is received from a customer into a VoIP softswitch or server of an originating service provider. The receiving VoIP switch or server is programmed to send an ENUM, SIP Redirect or other query to the transaction server. Information sent to the transaction server includes the dialed number (called customer identification).

The transaction server performs a query against all available telephone numbers in the ENUM table, and if no match is found between the dialed number and any numbers in the ENUM table, the application may (1) return control of the call back to the originating switch for normal switch-based routing (via a signaling path), or (2) hand the control of the call to the routing matrix in the transaction server as described below.

If there is no match for the dialed number in ENUM table, and the control of the call is handed to the routing matrix using internal programming, the transaction server then performs a search for a longest match against the dialed number, i.e., matching of the longest sequence of dialed digits, followed by a next longest match and so on, until all available carriers who are offering to terminate that phone call have been found. Since no matches have been found against the on-net carriers, no on-net carrier pricing will be taken into account in deriving this list of available carriers. The transaction server may then sort the carriers by price and/or other parameters, and return a list of route options to the originating switch for call processing based on a predetermined set of business rules provided by the operator of the originating switch or the operator of the transaction server. This list can be returned in the ENUM response or as part of a SIP Redirect message using available protocol messages. The originating switch then processes the call to the designated carriers in accordance with the list of route options provided.

If a match of the called number against a carrier is found in the ENUM table, then the call is handed, using internal programming, to the routing matrix for processing with the additional step of including the identity of the matching on-net carrier in the handoff to the routing matrix. The routing matrix application works in a similar way to that described above, except that the on-net carrier that owns the matched customer number is added to the list of potential providers with the specific price that that on-net carrier is offering for calls to its own customers. This supplemented routing matrix is then used to generate a list of route options to the originating switch using the ENUM or SIP Redirect response as explained above.

Although the above description assumes that price is the most important criteria, the transaction server may also use alternative rules. For example, the transaction server may use quality as the important criteria. For this purpose, the transaction server can receive an input from the processing of Call-Detail Records (CDRs) or other quality monitoring mechanisms or may receive the quality specified for each carrier. Quality parameters may include Answer Seizure Ratio, average duration of calls, the post dial delay, the latency of the audio, the quality of the audio as measured by jitter or latency or packet loss or any combination of these factors. The resultant route plan generated can then be ordered by quality alone or a combination of quality and price.

In one alternative embodiment, the transaction server can produce a list of available carriers with the on-net carrier which owns the matched customer number being automatically placed as the top of the list of route options.

In another alternative embodiment, the on-net carrier which owns the matched customer number is only placed first in the route list if their price is within a predetermined percentage of the lowest priced carrier or within a certain price above the lowest priced carrier.

In a further embodiment, communications traffic such as a telephone call or data message, which includes a called telephone number or terminating internet address of a receiving device, is sent from an access device (e.g., a personal computer, a facsimile machine, or a telephone) for routing by an originating service provider. The originating service provider queries a transaction server for a list of available terminating service providers with price and quality parameters associated with such terminating service providers. The transaction server retrieves or looks up a list of available carriers or service providers, applies business rules to the list and determines one or more preferred terminating service providers based on price and quality metrics, the originating service provider transmits the phone call or data message to the receiving device connected to the networks of the preferred terminating service provider (e.g., a personal computer, a facsimile machine, or a telephone).

The transaction server may monitor or receive data relating to the quality or performance of the networks and update the quality metrics associated with the appropriate service providers in the routing matrix.

The transaction server may also provide mediation and settlement of the communications traffic for the originating and terminating service providers if the communications traffic is directed, handled and/or monitored by the transaction server.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
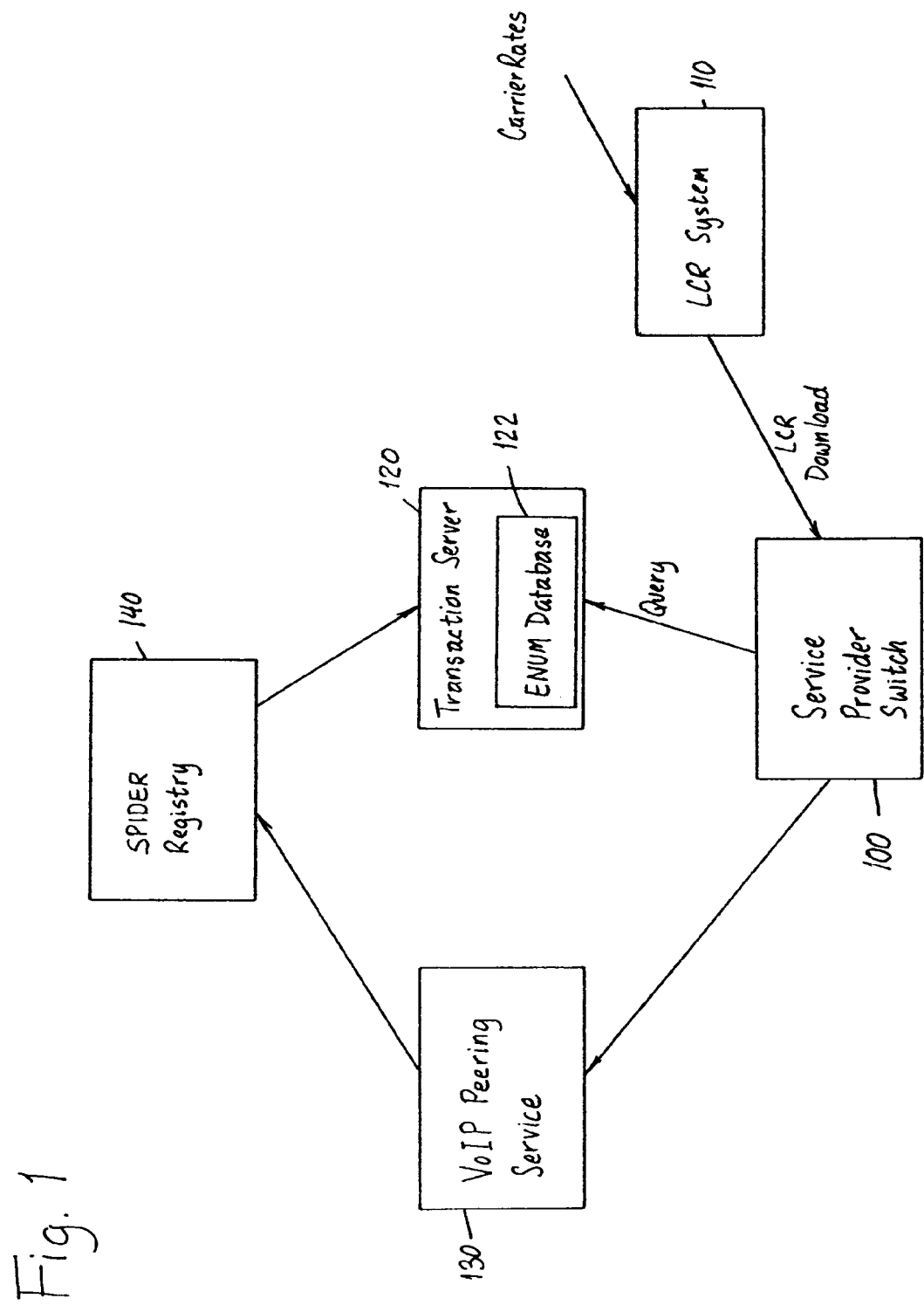
FIG. 1 is a schematic block diagram showing the interconnections between various components of a system according to an embodiment of the invention.

FIG. 1 is a block diagram showing an overview of the components of the system according to the present invention and includes a service provider switch 100, a Least Cost Routing (LCR) or other off-line routing matrix generation system 110, a transaction server 120. The system of the present invention also optionally includes a peering service 130 and a Service Provider ID E.164 Record (SPIDER) registry 140.

The LCR or other off-line routing matrix generation system 110 (hereafter referred to as the LCR system) analyzes and ranks carrier partners for each destination or market (e.g., a region of a country or a set of specific dialing codes) together with price and/or other parameters particular to each available carrier offering to terminate communications traffic to that destination or market. To keep the routing matrix current, the LCR system 110 receives a code set (which indicate the destination or market) and associated prices from numerous carriers on a periodic basis, i.e., weekly.

The transaction server 120 includes an ENUM database 122 which allows user to determine if the number dialed is a customer of a partner carrier and so can be accessed directly via an IP based peering relationship, i.e., if the dialed number is listed with an associated Internet domain name in the ENUM database 122 (described in more detail below). The transaction server 120 may, for example, be a NetNumber Transactional IP-Telephony Addressing & Numbering (TI-TAN) addressing server or a Nominum Navitas addressing server or may be developed internally by the carrier. When the transaction server receives a query for routes to a specific destination, it identifies the "best match" carriers which can provide service to the called number. Using the routing matrix generated by the LCR system 110 and the ENUM database 122, the transaction server 120 performs a search for codes with a longest match against the dialed number, i.e., matching of the longest sequence of dialed digits, followed by a next longest match and so on, until all available carriers who are offering to terminate that phone call have been found. The list of available carriers is ranked according to certain criteria. As described below, if the called number is found in the ENUM database, the carrier associated with that matched number in the ENUM database is taken into account during the determination of available carriers, i.e., the carrier associated with the matched number is one of the available carriers that is ranked. The ranking is normally by price but may have a quality or price override in which a minimum quality of required.

The Spider registry 140 is an optional registry which facilitates VoIP peering. The SPIDER registry is a database of service provider controlled interconnect addressing information. That is, various VoIP peering systems can register to share the telephone numbers and VoIP addresses, thereby expanding the number of VoIP end stations which can be serviced without using PSTN. The ENUM database 122 of the transaction server 120 may be downloaded from a central depository such as the SPIDER registry 140. The peering service 130 facilitates sharing of ENUM database numbers with other service providers. For example, the peering service may comprise a website or other program such as PeeringSolutions$^{SM}$ Service by Arbinet-thexchange, New Brunswick, N.J.

Figure 2:
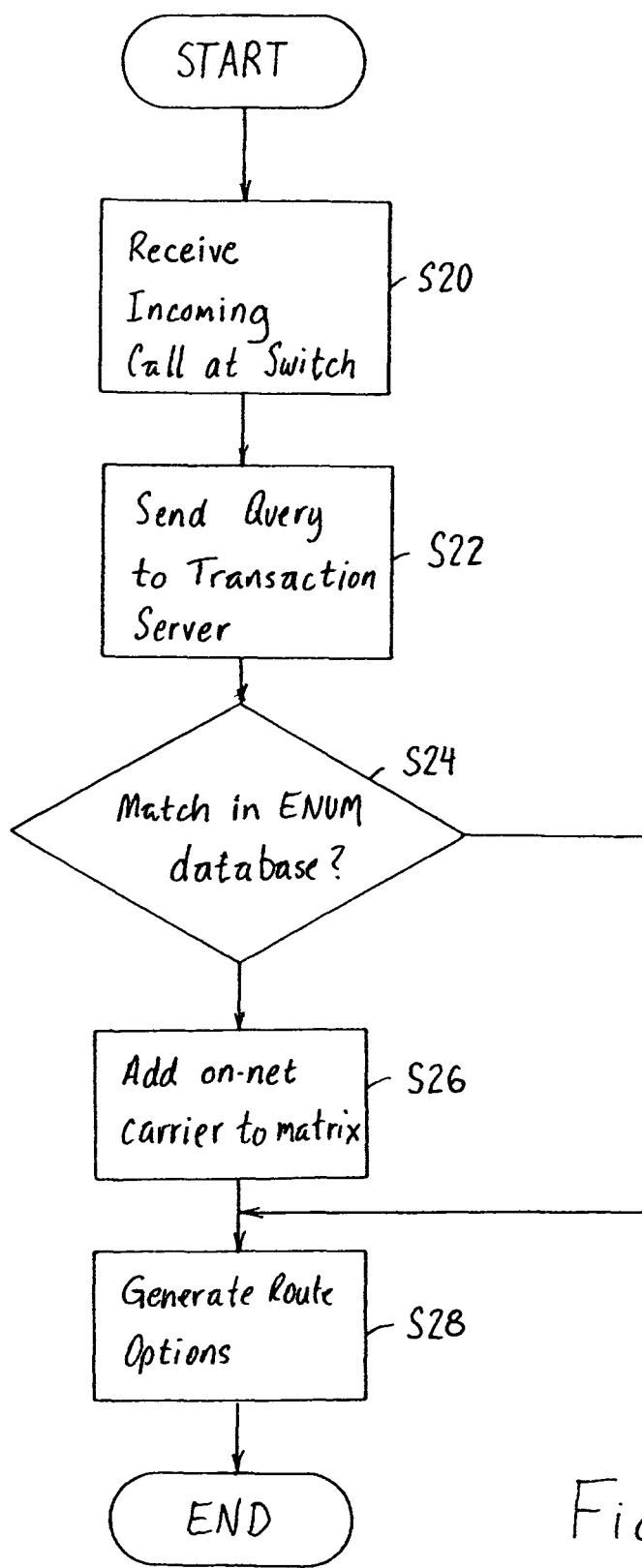
FIG. 2 is a flow diagram showing the steps according to a method according to the present invention.

According to an embodiment of the method according to the present invention which is shown in FIG. 2, an incoming call or other communication is received from a customer at a VoIP switch or server in the network of the service provider, step S20. The VoIP switch or server is programmed to send an ENUM, SIP redirect, or other query to the transaction server 120, step S22. The transaction server performs a query against all telephone numbers in the ENUM database 122 to determine whether the called number of the incoming call matches one of the numbers in the ENUM database, step S24. As stated above, the ENUM database 122 may be downloaded from a registry as described above.

If a match is found in step S24, the on-net carrier associated with the match number in the ENUM database 122 is added to the routing matrix generated by the LCR system 110, Step S26. The transaction server then uses the supplemented routing matrix to generate a list of route options for delivering the communications traffic to the called number. The list of route options is sent to the originating VoIP switch or server of the service provider. The list can be returned in the ENUM response or as part of a SIP redirect message. The list of route options may be sorted by price and/or other parameters based on a set of predetermined business rules. The originating switch then processes the call to the designated carrier in accordance with the route options.

If no matches of the called number are found in the ENUM database in step S24, then step S28 is performed with the route matrix generated by the LCR system 110.

As mentioned above, price is usually the most important criteria in ranking the available carriers for delivering the communications traffic. However, alternative rules may be applied. For example, the transaction server 120 may receive an input from processing of Call-Detail Records (CDRs) or other quality monitoring mechanisms or the quality specified for each carrier. Quality parameters may include Answer Seizure Ratio, average duration of calls, the post dial delay, the latency of the audio, the quality of the audio as measured by jitter or latency or packet loss or any combination of these factors. The resultant route options generated in step S28 may take into account quality alone or a combination of quality and price.

In another alternative embodiment, the transaction server 120 may place the carrier associated with the matched number in the ENUM database, i.e., the carrier determined in step S26, at the top of the list of route options. As a further alternative, the carrier determined in step S26 may be placed at the top of the list only if the price of that carrier is within a predetermined percentage of the lowest priced carrier or within a predetermined price above the lowest priced carrier.

Figure 3:
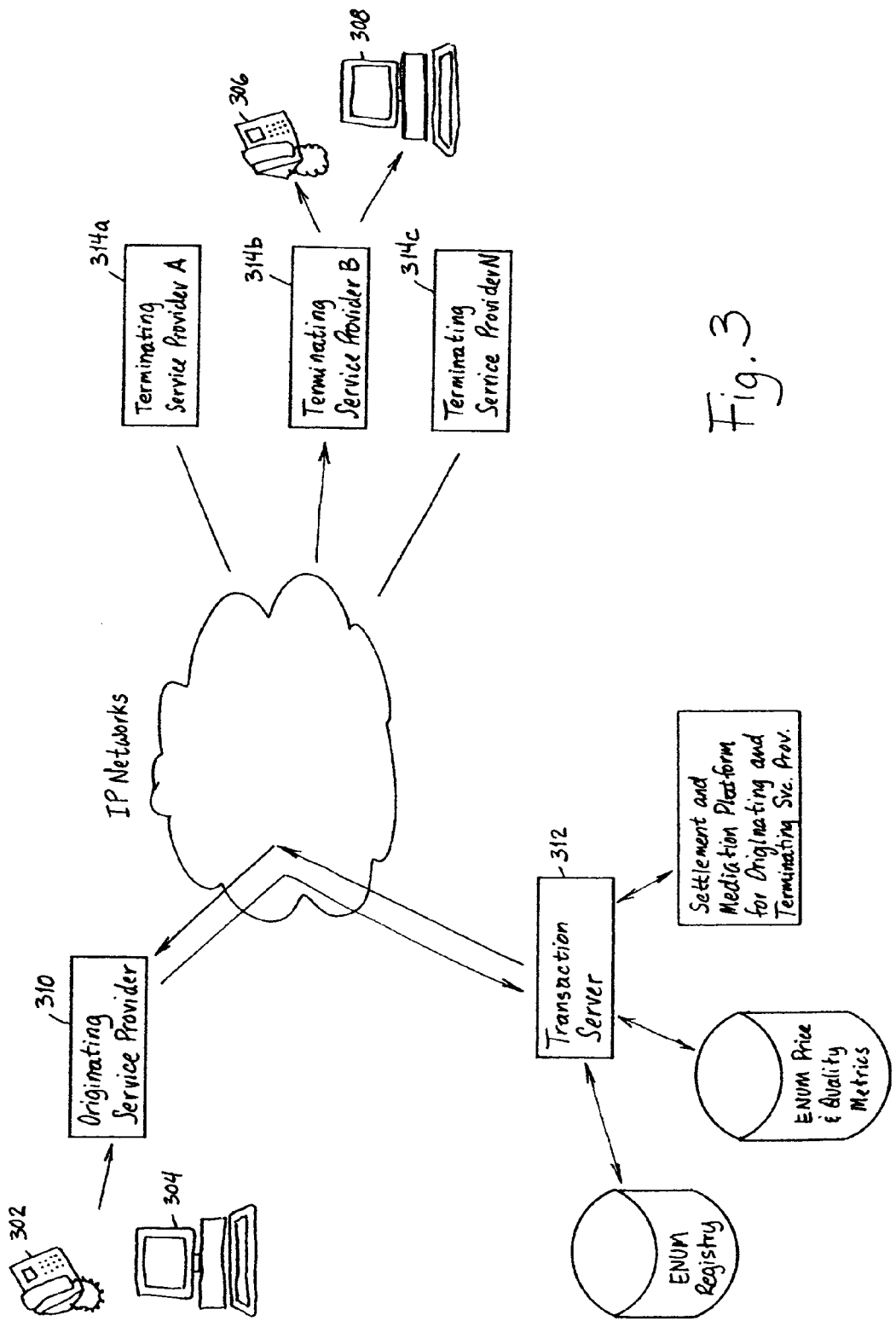
FIG. 3 is a schematic block diagram showing another embodiment of the system of the present invention.

FIG. 3 illustrates another example of how communications traffic may be selectively routed to preferred service providers in accordance with the present invention. In this embodiment, communications traffic such as a telephone call or data message, which includes a called telephone number or terminating internet address of a receiving device 306, 308, is sent from an access device 302, 304 (e.g., a personal computer, a facsimile machine, or a telephone) for routing by an originating service provider 310. The originating service provider 310 queries a transaction server 312 for a list of available terminating service providers 314a, 314b, 314c with price and quality parameters associated with such terminating service providers. The transaction server 312 retrieves or looks up a list of available carriers or service providers, applies business rules to the list and determines one or more preferred terminating service providers based on price and quality metrics, the originating service provider transmits the phone call or data message to the receiving device connected to the networks of the preferred terminating service provider (e.g., a personal computer, a facsimile machine, or a telephone).

The transaction server 312 may monitor or receive data relating to the quality or performance of the networks and update the quality metrics associated with the appropriate service providers in the routing matrix.

The transaction server 312 may also provide mediation and settlement of the communications traffic for the originating and terminating service providers if the communications traffic is directed, handled and/or monitored by the transaction server. The settlement may be accomplished using an accounting module as disclosed in U.S. Pat. No. 6,731,729, the entire contents of which are incorporated herein by reference.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of routing communications traffic comprising the steps of:
   receiving, at a switch or server of an originating service provider, incoming communications traffic including a terminating number or address;
   sending, by the switch or server, a query to a transaction server;
   determining, by the transaction server, whether the terminating number or address is reachable directly through the Internet by determining whether the terminating number or address matches a number in a database in communication with the transaction server;
   importing a routing matrix generated by an offline routing matrix generation process into the transaction server, the routing matrix including a matrix of routing choices for each destination or market with at least a price parameter particular to each available traditional telephone carrier offering to terminate traffic to the each destination or market; and
   if a match is found in said step of determining, then generating, by the transaction server, a list of available routes for delivering the communications traffic to the terminating number or address using both the carrier associated with the matched number and any carriers identified in the routing matrix generated by the offline routing matrix generation process that are capable of delivering traffic to the terminating number or address.

2. The method of claim 1, wherein the incoming communications traffic is a phone call.

3. The method of claim 1, wherein the database is an ENUM table.

4. The method of claim 1, wherein the routing matrix includes codes corresponding to call destinations or markets and said step of generating a list of available routes comprises a search for the codes with the longest match against the called telephone number.

5. The method of claim 1, wherein the list of available routes is ranked according to predetermined criteria.

6. The method of claim 5, wherein the predetermined criteria is price.

7. The method of claim 5, wherein the predetermined criteria is quality.

8. The method of claim 5, wherein the carrier associated with the matched number is placed at the top of the list of available routes.

9. The method of claim 5, wherein the carrier associated with the matched number is placed at the top of the list of available routes if the price of the carrier associated with the matched number is greater than the lowest price in the routing matrix by less than a predetermined percentage or if the price of the carrier associated with the matched number is greater than the lowest price in the routing matrix by less than a predetermined amount.

10. The method of claim 1, wherein the transaction server is an ENUM or SIP Redirect transaction server.

11. A transaction server comprising:
    a non-transitory computer readable medium for facilitating routing of communication traffic and an application stored on the non-transitory computer readable medium, the application comprising executable instructions for performing the steps of:
    receiving a query from a service provider for a carrier for delivering communications traffic to a destination number or address;
    determining, by the transaction server, whether the destination number or address is reachable directly through the Internet by determining whether the terminating number or address matches a number in a database in communication with the transaction server;
    importing a routing matrix generated by an offline routing matrix generation process into the transaction server, the routing matrix including a matrix of routing choices for each destination or market with at least a price parameter particular to each available traditional telephone carrier offering to terminate to the each destination or market; and
    if a match is found in said step of determining, then generating, by the transaction server a list of available routes for delivering the communications traffic to the terminating number or address using both the carrier associated with the matched number and any carriers identified in the routing matrix generated by the offline routing matrix generation process that are capable of delivering traffic to the terminating number or address.

12. The transaction server of claim 11, wherein the communications traffic is a phone call.

13. The transaction server of claim 12, wherein the transaction server includes the database and the database is an ENUM table.

14. The transaction server of claim 11, wherein the routing matrix includes codes corresponding to call destinations or markets and said step of generating a list of available routes comprises a search for the codes with the longest match against the called telephone number.

15. The transaction server of claim 11, wherein the list of available routes is ranked according to predetermined criteria.

16. The transaction server of claim 15, wherein the predetermined criteria is price.

17. The transaction server of claim 15, wherein the predetermined criteria is quality.

18. The transaction server of claim 15, wherein the carrier associated with the matched number is placed at the top of the list of available routes.

19. The transaction server of claim 15, wherein the carrier associated with the matched number is placed at the top of the list of available routes if the price of the carrier associated with the matched number is less than the lowest price in the routing matrix by at least a predetermined percentage or if the price of the carrier associated with the matched number is less than the lowest price in the routing matrix by at least a predetermined amount.

20. The transaction server of claim 11, wherein the transaction server is an ENUM or SIP Redirect transaction server.

* * * * *